United States Patent [19]

Bonnet

[11] Patent Number: 5,450,944
[45] Date of Patent: Sep. 19, 1995

[54] DEVICE FOR GRASPING AND TRANSPORTING OBJECTS

[76] Inventor: Werner Bonnet, Mühläckerstrasse 6, D-7140 Ludwigsburg 12, Germany

[21] Appl. No.: 107,746
[22] PCT Filed: Feb. 21, 1992
[86] PCT No.: PCT/DE92/00130
  § 371 Date: Dec. 8, 1993
  § 102(e) Date: Dec. 8, 1993
[87] PCT Pub. No.: WO92/14664
  PCT Pub. Date: Sep. 3, 1992

[30] Foreign Application Priority Data

Feb. 21, 1991 [DE] Germany ............ 41 05 388.5

[51] Int. Cl.⁶ ............................................. B65G 17/46
[52] U.S. Cl. .............................. 198/471.1; 198/689.1
[58] Field of Search ............... 198/471.1, 689.1, 811; 271/197

[56] References Cited

U.S. PATENT DOCUMENTS

| | | | |
|---|---|---|---|
| 2,895,552 | 7/1959 | Pomper et al. | 198/689.1 X |
| 2,905,309 | 9/1959 | Makrides | 198/689.1 X |
| 2,941,653 | 6/1960 | Kriemelmeyer, Jr. | 198/689.1 X |
| 2,969,869 | 1/1961 | Klingler | 198/689.1 |
| 3,168,958 | 2/1965 | Grossi | 198/689.1 X |
| 3,375,917 | 4/1968 | Irving, Jr. | 198/689.1 X |
| 3,477,558 | 11/1969 | Fleischauer | 271/197 X |
| 3,708,058 | 1/1973 | Kalven | 198/689.1 |

FOREIGN PATENT DOCUMENTS

| | | |
|---|---|---|
| 0155475 | 9/1985 | European Pat. Off. . |
| 0179564 | 4/1986 | European Pat. Off. . |
| 6934921 | 9/1969 | Germany . |
| 1923440 | 11/1970 | Germany . |
| 1556205 | 12/1971 | Germany . |
| 1531946 | 9/1972 | Germany . |
| 1781437 | 4/1973 | Germany . |
| 2222648 | 11/1973 | Germany . |
| 3609786 | 9/1987 | Germany . |
| 3701564 | 5/1988 | Germany . |
| 8913362 | 3/1990 | Germany . |
| 9012050 | 12/1990 | Germany . |
| 2028247 | 3/1980 | United Kingdom ........ 198/689.1 |
| 2179906 | 3/1987 | United Kingdom . |

*Primary Examiner*—D. Glenn Dayoan
*Attorney, Agent, or Firm*—Speckman, Pauley & Fejer

[57] ABSTRACT

A device for grasping and transporting objects, wherein the device has a plurality of plate-shaped supports combined into a rotating conveyer chain. Each support has at least one suction opening on a transport side of the support, which is connected over at least a portion of a transport path. A fixed suction conduit can be sealed airtight against the atmosphere. Each suction opening is in communication with a supply of suction air or compressed air. The supports are adjustably guided in guide rails which receive edges of the supports that extend parallel to a direction of conveyance. The suction openings are formed as elongated holes within the supports. The elongated holes are aligned in the direction of conveyance. The elongated holes are sealingly connected on a side facing away from the transport side with a fixed suction conduit that extends along the transport path. The suction conduit is formed as a conduit rail and encloses the elongated holes with front faces of the two side legs. The side legs are supported on either the supports or connecting strips which are fastened on the supports. Enlarged holes correspond to the elongated holes and make a transition into the elongated holes.

14 Claims, 2 Drawing Sheets

DEVICE FOR GRASPING AND TRANSPORTING OBJECTS

BACKGROUND OF THE INVENTION

1. Field of the Invention

This invention relates to a device for grasping and transporting objects, having a number of plate-shaped supports combined into a rotating conveyor chain, wherein each support has at least one suction opening on its transport side, which is connected over at least a portion of the transport path with a fixed suction conduit that can be sealed airtight against the atmosphere and that leads to a supply point for suction air or compressed air. The supports are adjustably guided in guide rails which receive the edges of the supports extending parallel to the direction of conveyance.

2. Description of Prior Art

A device of this type is known from German Patent DE 37 01 564 C1. In this device it is only possible to dispose bores of small diameter because of the lesser thickness of the supports and the structural height of the guide rails connected therewith. Therefore the suction plates have only little suction force and thus holding ability. For this reason the conventional device is particularly suited for grasping and transporting light objects with smooth surfaces.

SUMMARY OF THE INVENTION

It is one object of this invention to provide a device of the above mentioned type wherein it is also possible to grasp and transport heavier objects which do not have smooth surfaces.

In accordance with this invention, the above object is achieved with suction openings that are cut into supports in the form of holes. The holes in the supports are sealingly connected on the side facing away from the transport side with the fixed suction conduit extending along the transport path.

In spite of the small thickness of the support, the hole in the support can have a considerably large surface, so that it is possible to obtain a greater holding force by suction air, which is distributed over a large surface of the object and therefore does not require an absolutely tight sealing of the hole.

To be able, nevertheless, to keep the width of the suction conduit small, in a further embodiment of this invention, the holes in the supports are embodied as elongated holes aligned in a direction of conveyance.

So that no leaks occur at the places where the supports meet, in a further embodiment of this invention, the supports are sealed with respect to each other at the edges extending crosswise to the direction of conveyance with sealing elements, which extend at least over the area of the suction conduit disposed above the holes.

In accordance with yet a further embodiment according to this invention, it is possible to enlarge the suction surfaces of the support in a simple manner since the holes of the supports make a transition into enlargements on the transport side.

If the transport side of the support has an open-pored suction plate, which covers the hole or its enlargement, the suction surface is resilient so that it can be adapted to irregularities of the grasped and held object.

A further embodiment of this invention provides that the side of the support facing the transport side has a connecting strip extending in the direction of conveyance, provided with an opening that corresponds to a hole of the supports and which makes a transition into it. These connecting strips are provided on a front extending crosswise to the direction of conveyance with the sealing element which seals in the direction toward the connecting strip of the adjacent support.

The material of the connecting strips can be adapted to the material for the suction conduit in such a way that a tight connection with little friction is obtained. In addition, the connecting strips connected with the supports can be replaced if leaks occur after prolonged use. The conveyor chain with the supports does not need to be dismantled for this operation.

The connection of the supports with a conveyor chain is simplified in that the side of the support facing away from the transport side has a pair of chain connecting elements on both sides of the connecting strips. These chain connecting elements are connected with each other across the joints of the supports with chain links.

If at least one of the guide rails has a conduit extending over the length of the transport path and has a conduit connection, which is completed and sealed by the supports guided in the guide rails, at least one bore starts at the front of the support guided in the guide rail and continues into connecting conduits extending to the transport side, and the connecting conduits are connected with suction plates, it is then also possible to equip the support selectively with suction plates, too, in order to be able to grasp and transport light objects with smooth surfaces. For sealing the conduit in the guide rail the supports can be sealed in the area of the guide rails with sealing elements.

Operation of the device can also be accomplished with compressed air if the bores in the supports extend beyond the connecting conduits as far as the oppositely located front, the conduit connection is charged with compressed air and a Venturi nozzle is inserted into the bore of the support from the direction of the connecting conduits.

The sealing of the suction conduit on the side of the support facing away from the transport side is improved if the suction conduit is formed by a U-shaped rail which is closed off at its ends and is resiliently supported by the front ends of its lateral legs on the supports or on the connecting strips fastened on the supports.

BRIEF DESCRIPTION OF THE DRAWINGS

This invention will be explained in detail by exemplary embodiments illustrated in the drawings wherein.

DESCRIPTION OF PREFERRED EMBODIMENTS

Figure 1:
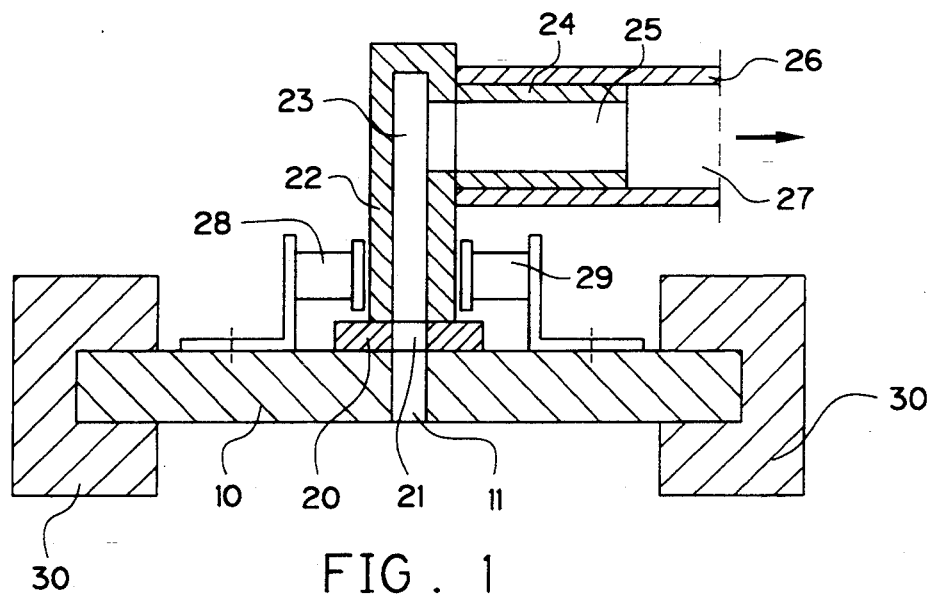
FIG. 1 is a cross section taken through the device, which shows the guidance of the supports in guide rails and the connection for the suction air.

The cross section taken through the device shown in FIG. 1 extends crosswise to the direction of conveyance of the conveyor chain, wherein the transport side of the supports 10 is downwardly oriented. However, the device can also be used if rotated by 180° with the transport side oriented toward the top. In the first case, the grasped objects are transported hanging and in the second case the grasped objects are transported lying on top. The conveyor chain can also be used so that it is inclined upward, downward or even aligned vertically. This only depends on the weight of the objects and the suction force provided by the central supply device.

Figure 2:
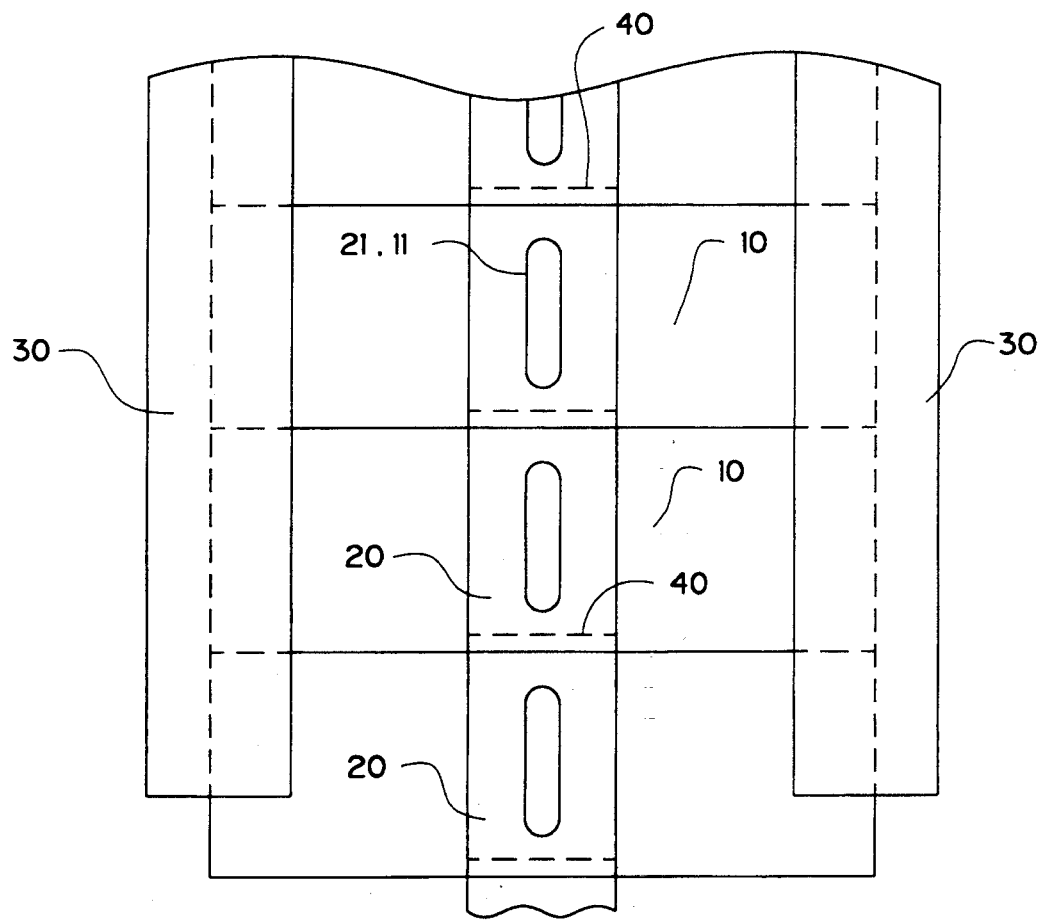
FIG. 2 is a top view of the device in accordance with FIG. 1, on the supports guided in the guide rails with connecting strips and with the suction conduit removed.

As shown in the cross section of FIG. 1, the edge areas of the plate-shaped supports 10 extending parallel to the direction of conveyance are adjustably guided in U-shaped guide rails 30 at least over the transport path provided, wherein the supports 10 are moved, if possible without a large amount of play, in the receptacles of the guide rails 30. Holes 11, shown as elongated holes are cut into the supports 10 and form a suction opening with a large cross section on the transport side. The elongated holes 11 are aligned in the direction of conveyance and continue into the holes 21 in the connecting plates 20. As shown by the top view in FIG. 2, these connecting plates 20 extend in the direction of conveyance of the conveyor chain over the entire width of the supports 10. The supports 10 have a sealing element 40 on one front end, which seals against the front end of the connecting plate 20 of the adjacent support 10, so that the support plates 20, which are aligned in the direction of conveyance, have a closed, sealed top. The conduit rail 22, forming a suction conduit 23, is supported on this top of the connecting plates 20. The suction conduit 23 extends over the entire transport path and is closed off at the ends. The conduit rail 22 is supported by the front ends of its side rail on the connecting plates 20 in such a way that the suction conduit 23 encloses the holes 21 of the connecting plates 20. The conduit rail 22 can be resilient in order to obtain a tight connection between the side legs of the conduit rail 22 and the connecting plates 20, which does not leak even when the conveyor chain is transporting.

A connector 24 with the bore 25 branches off the suction conduit 23. A suction hose 26 with an inner receiver 27 is pushed onto the connector 24 and leads to the central supply unit which, in the present case, generates suction air in a sufficient amount and of sufficient underpressure, so that all openings 11 of the supports 10 located under the suction conduit 23 along the transport path can grasp objects by suction and hold them. When the support 10 leaves the transport path, i.e. the suction conduit, the object is released and can be removed or further transported. The conduit rail 22 can also be directly supported by the supports 10 and can enclose the holes 11 with the suction conduit 23. However, disposing the connecting plates 20 on the supports 10 has the advantage that they can be easily replaced if leaks occur after prolonged use. In this case, the connecting plates 20 are preferably releasably connected with the supports 10 by means of screw connections.

For transporting the supports 10, pairs of chain connection elements 28 and 29 are fastened on the side of the supports 10 facing away from the transport side, namely on both sides of the connecting plates 20. The supports 10 are combined into the conveyor chain with the aid of chain members which bridge the joints between adjacent supports 10. The chain members permit the reversal of the conveyor chain with the aid of appropriately embodied chain gears.

Figure 3:
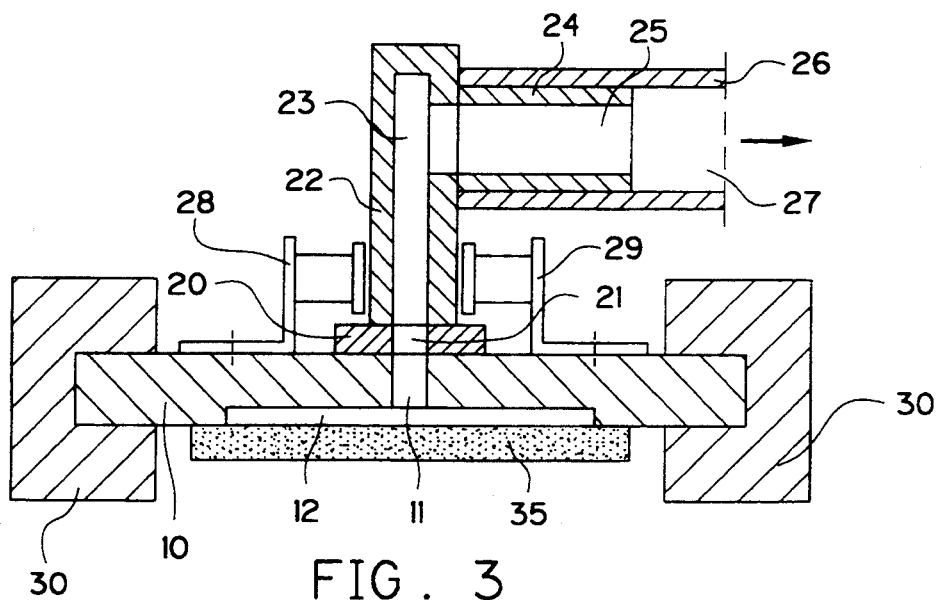
FIG. 3 is a cross section corresponding to FIG. 1 taken through the device, wherein the hole in the support has been widened on the transport side and is covered by an open-pored connecting plate.
Figure 4:
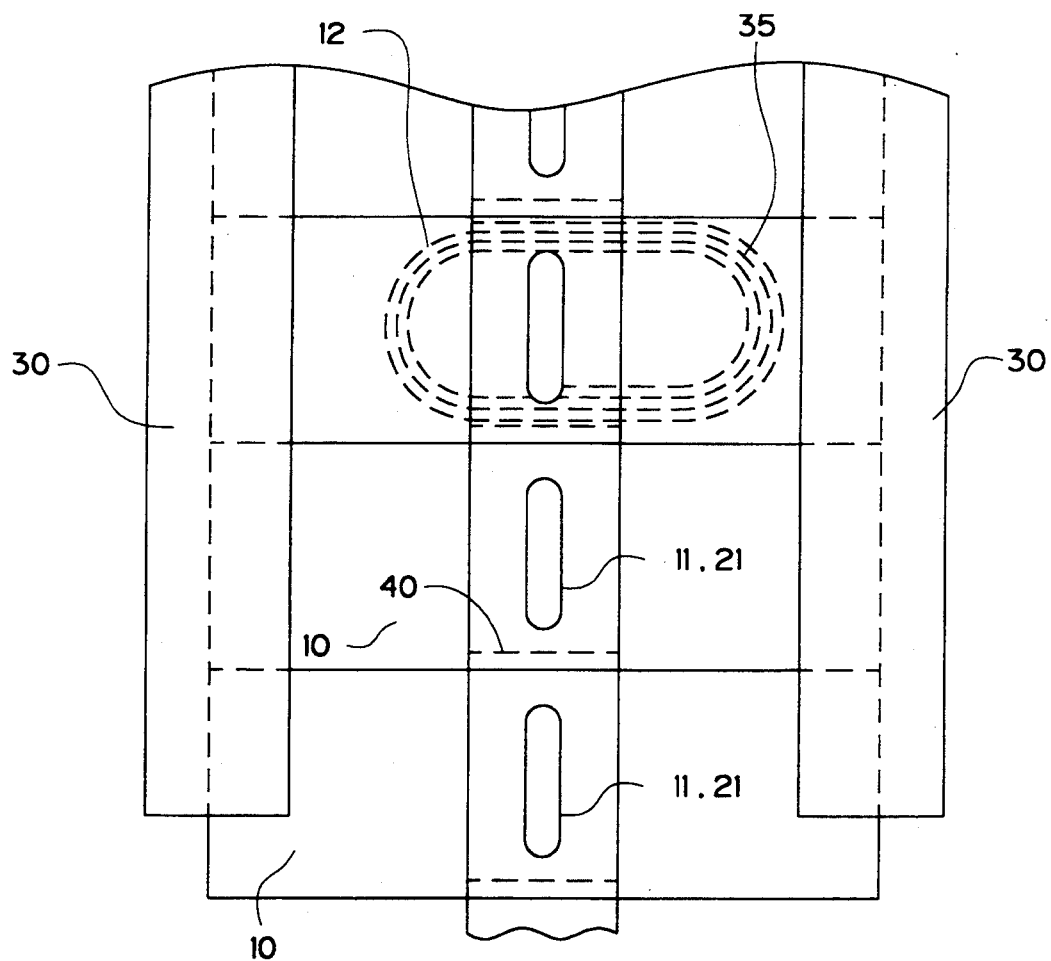
FIG. 4 is a top view of the device in accordance with FIG. 3, corresponding to FIG. 2.

In the preferred embodiment shown in FIGS. 3 and 4, the holes 11 of the supports 10 are widened on the transport side, as shown by the enlargement 12. By means of this the suction surface on the transport side is enlarged. The enlargement 12 of the hole 11 can be covered by an open-pored suction plate 35. When using a suction plate 35 made of open-pored plastic foam material, for example, the suction surface has a certain degree of inherent resilience, so that it can adapt itself to irregularities of the object grasped by suction. The suction plate 35 must be open-pored, so that many suction conduits are formed in the suction plate 35, which are all connected via the enlargement 12 with the hole 11 of the support 10 charged with suction air. The hole 11 extends practically over the entire width of the support 10.

I claim:

1. In a device for grasping and transporting objects, having a plurality of plate-shaped supports combined into a rotating conveyor chain, wherein each said support has at least one suction opening on a transport side which is connected over at least a portion of a transport path with a fixed suction conduit which can be sealed airtight against the atmosphere and which is in communication with a supply for suction air or compressed air, and wherein said supports are adjustably guided in guide rails which receive edges of said supports extending parallel to a direction of conveyance, the improvement comprising:

said at least one suction opening cut into said supports (10) in a form of elongated holes (11), said elongated holes (11) aligned in said direction of conveyance; and said elongated holes (11) of said supports (10) being sealingly connected on a side facing away from said transport side with a fixed suction conduit (23) extending along said transport path, said suction conduit (23) formed as a conduit rail (22) and enclosing said elongated holes (11) with fronts of two side legs of said suction conduit (23), is directly supported on one of said supports (10) and connecting strips (20) fastened on said supports (10) and has enlarged holes corresponding to said elongated holes that make a transition into said elongated holes (11).

2. In a device in accordance with claim 1, wherein said supports (10) are sealed with respect to each other at said edges extending crosswise to said direction of conveyance by means of sealing elements (40), which extend at least over an area of said suction conduit (23) disposed above said elongated holes (11).

3. In a device in accordance with claim 1, wherein said elongated holes (11) of said supports (10) make a transition into enlarged bores (12) on said transport side.

4. In a device in accordance with claim 3, wherein said transport side of said support (10) has an open-pored suction plate (35) which covers one of a corresponding said elongated hole (11) and a corresponding said enlarged bore (12).

5. In a device in accordance with claim 4, wherein said connecting strips (20) of said supports (10) have on a front extending crosswise to said direction of conveyance said sealing element (40) which seals in a direction towards said connecting strip (20) of said adjacent support (10).

6. In a device in accordance with claim 5, wherein said side of said support (10) facing away from said transport side has a pair of chain connecting elements (28, 29) on both sides of said connecting strip (20).

7. In a device in accordance with claim 6, wherein said suction conduit (23) is formed by a U-shaped rail (22) which is closed off at ends of said U-shaped rail (22) and is resiliently supported by front faces of said side legs on one of said supports (10) and connecting strips (20) fastened on said supports (10).

8. In a device in accordance with claim 7, wherein said elongated holes (11) extend almost over an entire width of said supports (10) extending in said direction of conveyance.

9. In a device in accordance with claim 1, wherein said elongated holes (11) of said supports (10) make a transition into enlarged bores (12) on said transport side.

10. In a device in accordance with claim 1, wherein said transport side of said support (10) has an open-pored suction plate (35) which covers one of a corresponding said elongated hole (11) and a corresponding said enlarged bore (12).

11. In a device in accordance with claim 1, wherein said connecting strips (20) of said supports (10) have on a front extending crosswise to said direction of conveyance a sealing element (40) which seals in a direction towards said connecting strip (20) of said adjacent support (10).

12. In a device in accordance with claim 1, wherein said side of said support (10) facing away from said transport side has a pair of chain connecting elements (28, 29) on both sides of said connecting strip (20).

13. In a device in accordance with claim 1, wherein said suction conduit (23) is formed by a U-shaped rail (22) which is closed off at ends of said U-shaped rail (22) and is resiliently supported by front faces of said side legs on one of said supports (10) and connecting strips (20) fastened on said supports (10).

14. In a device in accordance with claim 1, wherein said elongated holes (11) extend almost over an entire width of said supports (10) extending in said direction of conveyance.

* * * * *